United States Patent [19]

Kawakami et al.

[11] Patent Number: 5,853,639
[45] Date of Patent: Dec. 29, 1998

[54] ORIENTED POLYGLYCOLIC ACID FILM AND PRODUCTION PROCESS THEREOF

[75] Inventors: Yukichika Kawakami; Nobuo Sato; Mitsuru Hoshino; Toshitaka Kouyama, all of Fukushima; Zenya Shiiki, Chiba, all of Japan

[73] Assignee: Kureha Kagaku Kogyo K.K., Tokyo, Japan

[21] Appl. No.: 844,408

[22] Filed: Apr. 18, 1997

[30] Foreign Application Priority Data

Apr. 30, 1996 [JP] Japan ................................. 8-134217
Apr. 8, 1997 [JP] Japan ................................. 9-105160

[51] Int. Cl.⁶ ............................. B29C 47/12; B52B 5/00
[52] U.S. Cl. ............................ 264/177.19; 264/177.2; 264/DIG. 73; 428/221; 428/323; 528/354; 528/361
[58] Field of Search ................... 528/354, 361; 428/323; 264/177.19

[56] References Cited

U.S. PATENT DOCUMENTS

| | | | |
|---|---|---|---|
| 2,668,162 | 2/1954 | Lowe | 528/357 |
| 2,676,945 | 4/1954 | Higgins | 528/354 |
| 4,137,921 | 2/1979 | Okuzumi et al. | 528/354 |
| 5,502,158 | 3/1996 | Sinclair et al. | 528/354 |

FOREIGN PATENT DOCUMENTS

| | | |
|---|---|---|
| 0677561 | 10/1995 | European Pat. Off. |
| 6-256480 | 9/1994 | Japan. |
| 6-256481 | 9/1994 | Japan. |
| 7-173271 | 7/1995 | Japan. |
| 7-257660 | 10/1995 | Japan. |
| WO9204412 | 3/1992 | WIPO. |

OTHER PUBLICATIONS

D.K. Gilding et al (1979) *Polymer*, vol. 20, pp. 1459–1463.

Primary Examiner—Tae Yoon
Attorney, Agent, or Firm—Dinsmore & Shohl LLP

[57] ABSTRACT

The invention provides an oriented polyglycolic acid film formed from a thermoplastic resin material which comprises polyglycolic acid having a repeating unit represented by the following formula (1):

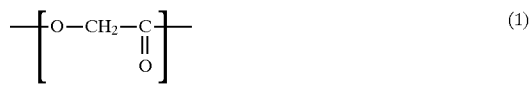

and the following physical properties:

(a) the melt viscosity, $\rho^*$ [as measured at a temperature of (the melting point, Tm of the polymer+20° C.) and a shear rate of 100/sec] being 500–100,000 Pa.s;
(b) the melting point, Tm being at least 150° C.;
(c) the melt enthalpy, $\Delta Hm$ being at least 20 J/g; and
(d) the density being at least 1.50 g/cm³ as measured in an unoriented, crystallized form, wherein the film has tensile strength of at least 150 MPa, and production processes thereof.

21 Claims, No Drawings

ORIENTED POLYGLYCOLIC ACID FILM AND PRODUCTION PROCESS THEREOF

FIELD OF THE INVENTION

The present invention relates to oriented films formed from a thermoplastic resin material comprising polyglycolic acid, and more particularly to oriented polyglycolic acid films which have excellent degradability in soil, barrier properties, heat resistance and resistance to heat shrinkage, and practicable strength, and to production processes thereof. The oriented polyglycolic acid films according to the present invention can be used in a wide variety of fields as, for example, packaging materials, carrier bags and refuse sacks.

BACKGROUND OF THE INVENTION

In recent years, increase in plastic waste has become a great social problem. Since many of polymeric materials have hitherto been developed and produced in search of high performance and long-term stability, they are not easily decomposed in a natural environment. Therefore, how to dispose and manage a large quantity of plastic waste which has become useless becomes a social problem on a worldwide scale. The plastic waste includes films formed from a variety of synthetic resins, such as polyolefin resins such as polyethylene and polypropylene, polyamide resins such as nylon, and chlorine-containing resins such as polyvinylidene chloride, and bags, containers and the like formed from these films, for example, barrier films, packaging films, carrier bags, refuse sacks and wrapping films.

Under the circumstances, biodegradable polymers, which are degraded by natural microorganisms, attract attention as polymeric materials which impose no burden on the environment. The biodegradability can be evaluated by, for example, a degradability test in soil (soil degradability test). Since plastic films are required to have good barrier property (oxygen gas barrier property, carbon dioxide barrier property or water vapor barrier property), mechanical properties, thermal properties, melt processability, profitability and the like, however, any plastic film, which fully satisfies these requirements and exhibits biodegradability, has not been yet obtained.

Among the conventional biodegradable plastic films, for example, films based on starch are unsatisfactory in barrier properties, mechanical properties and heat resistance and involve a problem that they are difficult to melt-process, so that its processing cost becomes high. Films based on cellulose are unsatisfactory in barrier properties and mechanical strength and involve a problem that they are difficult to melt-process, so that its processing cost becomes high. Films based on a microorganism-produced polyester are unsatisfactory in barrier properties and mechanical strength and involve a great problem that their production cost becomes particularly high. Films (Japanese Patent Application Laid-Open No. 173271/1995) based on a synthetic type polyester such as a polysuccinate are unsatisfactory in barrier properties, strength and heat resistance and involve a problem that succinic acid and butanediol, which are raw materials for the polyester, are considerably expensive.

Films (Japanese Patent Application Laid-Open No. 257660/1995) based on polylactic acid, which is a semi-synthetic type polyester, have a water vapor permeability as great as 120 g/m².day or more and are unsatisfactory in barrier properties and mechanical properties. Since L-lactic acid, which is an optically active substance used as a raw material, is required to have a high purity, the films must be produced through fermentation of a biological process, and there is hence a limit to their production at low cost. Further, since polylactic acid has a high glass transition temperature, Tg, it also involves a problem that it is difficult to compost under ordinary composting conditions.

With respect to films based on polyglycolic acid, which are synthetic polyester films, Higgins et al. (U.S. Pat. No. 2,676,945, issued in 1954) disclose amorphous films having a thickness of 3 mils and biaxially stretched films obtained by stretching them. These films are those obtained by using a polymer obtainable by directly polycondensing glycolic acid, not a polymer obtainable by ring-opening polymerization of glycolide. However, the polycondensation process of glycolic acid includes heating and polycondensing glycolic acid for a long period of time as about 40 hours at a high temperature of at least 200° C. and hence tends to involve side reactions such as decomposition reaction. Accordingly, this process is difficult to provide a practicable polymer having a high molecular weight. U.S. Pat. No. 2,676,945 describes, in its example, the melt viscosity of the polymer as about 2,000 poises (at 245° C.). This melt viscosity value corresponds to a value measured at a shear rate of about 0/sec. This melt viscosity value corresponds to a value extremely as low as about 20 poises (at 245° C.) when converted into a value measured at a shear rate of 100/sec. In addition, there is a high possibility that this polymer may have an unstable structure due to side reactions. Accordingly, the oriented films formed from the polymer obtained by such a direct polycondensation process have extremely low mechanical strength and hence have involved a problem that they are insufficient from the view point of practical use.

Gilding et al. [POLYMER, 20, 1459 (1979)] report that films having a thickness of 250 μm were produced from 20% solutions of glycolic acid copolymers (glycolide/lactide=90/10, 70/30, 50/50, etc.) by a casting process. However, this process tends to form coarse spherulites upon evaporation of a solvent, and the resultant films are not oriented films and hence unsatisfactory in mechanical strength from the viewpoint of practical use.

Japanese Patent Application Laid-Open Nos. 256480/1994 and 256481/1994 disclose that polyglycolic acid having a viscosity-average molecular weight of 280,000 or 250,000 was used as a raw material, this polymer was melt-extruded and cast at 280° C. into an unoriented sheet, and the unoriented sheet was then stretched 3 times in a machine direction and 4 or 3 times in a transverse direction at 160° C. to obtain a biaxially oriented film (in each document, Example 3). However, polyglycolic acid tends to undergo thermal decomposition at a temperature exceeding about 255° C. and actually substantially undergoes thermal decomposition at the temperature as high as 280° C., so that any satisfactory unoriented sheet cannot be obtained. It is a matter of course that if such an unoriented sheet is biaxially stretched, it is scarcely possible to obtain a biaxially oriented film having sufficient strength. An amorphous sheet of polyglycolic acid is crystallized at a temperature exceeding its crystallization temperature $Tc_1$ (about 80° C.) and highly crystallized at a temperature as high as 160° C., so that the biaxial stretching of the amorphous sheet, for example, 3 times in a machine direction and 3 or 4 times in a transverse direction, is extremely difficult or actually impossible under such stretching conditions (see Comparative Example 3 in the specification of the present application). Accordingly, any oriented film having sufficient strength cannot be obtained under the conditions disclosed in these publications. Besides, the meaning of the viscosity-average molecular weight of 250,000 or 280,000 and its measuring method are also unclear. Accordingly, it can be hardly said that these publications actually disclose high-molecular weight polyglycolic acid in the light of the state of the art.

OBJECTS AND SUMMARY OF THE INVENTION

It is an object of the present invention to provide oriented polyglycolic acid films, which have excellent barrier properties, heat resistance and resistance to heat shrinkage, and practicable strength.

Another object of the present invention is to provide oriented polyglycolic acid films cheaply, which have excellent various properties and moreover exhibit high degradability in soil.

The present inventors have carried out an extensive investigation with a view toward overcoming the above problems involved in the prior art. As a result, it has been found that oriented films formed from a thermoplastic resin material comprising polyglycolic acid having specific physical properties have sufficient mechanical strength, exhibit good degradability in soil (decomposability in soil) and high barrier properties as demonstrated by its oxygen permeability (as measured at a temperature of 23° C. and 80% relative humidity; in terms of the thickness of 25 μm) of 50 cc/m².day.atm or smaller, also have excellent carbon dioxide barrier property, water vapor barrier property, heat resistance and the like and can be produced at a relatively low price.

The polyglycolic acid used in the oriented films according to the present invention can be obtained, for example, by heating glycolide (i.e., a dimeric cyclic ester of glycolic acid) in the presence of a catalyst (for example, a cationic catalyst such as a tin organic carboxylate, tin halide or antimony halide), thereby subjecting it to bulk ring-opening polymerization or solution ring-opening polymerization. In order to obtain polyglycolic acid having excellent physical properties, it is preferable to use high-purity glycolide as a monomer. The high-purity glycolide can be obtained with good productivity by a process in which an oligomer of glycolic acid is mixed with a high-boiling polar organic solvent, the mixture is heated under ordinary pressure or reduced pressure to a temperature at which depolymerization of the oligomer occurs, thereby depolymerizing the oligomer in a state that the oligomer forms a solution phase, glycolide formed is distilled out together with the high-boiling polar organic solvent, and the glycolide is recovered from the distillate. A copolymer obtained by ring-opening copolymerization of the glycolide and a comonomer copolymerizable therewith may also be used as polyglycolic acid.

Examples of a process for forming an oriented film from the polyglycolic acid include a process in which the polyglycolic acid alone or a composition containing the polyglycolic acid is melt-extruded through a T-die into a sheet, and the sheet thus extruded is uniaxially or biaxially stretched, and a blown-film extrusion and biaxial stretching process.

The polyglycolic acid can be industrially mass-produced by using extremely cheep raw materials of CO, $H_2O$ and $CH_2O$ or ethylene glycol. Since the oriented polyglycolic acid films have degradability in soil, they scarcely impose burden on the environment.

The present invention has been led to completion on the basis of these findings.

According to the present invention, there is thus provided an oriented polyglycolic acid film formed from a thermoplastic resin material which comprises polyglycolic acid having a repeating unit represented by the following formula (1):

and the following physical properties:

(a) the melt viscosity, $\eta^*$ [as measured at a temperature of (the melting point, Tm of the polymer+20° C.) and a shear rate of 100/sec] being 500–100,000 Pa.s;

(b) the melting point, Tm being at least 150° C.;

(c) the melt enthalpy, $\Delta Hm$ being at least 20 J/g; and (d) the density being at least 1.50 g/cm³ as measured in an unoriented, crystallized form, wherein the film has tensile strength of at least 150 MPa.

The high-strength, oriented film according to the present invention is preferably a uniaxially oriented or biaxially oriented film obtainable by melt-extruding the thermoplastic resin material in a temperature range of from Tm to 255° C., quenching an extrudate into a sheet or tube and stretching the sheet or tube in a temperature range of from the glass transition temperature, Tg of the polymer to the crystallization temperature, $Tc_1$ of the polymer in at least a uniaxial direction at a draw ratio higher than one time but not higher than 20 times. The oriented film according to the present invention preferably has high barrier properties as demonstrated by its oxygen permeability (as measured at a temperature of 23° C. and 80% relative humidity; in terms of the thickness of 25 μm) of 50 cc/m².day.atm or smaller or its carbon dioxide permeability (as measured at a temperature of 23° C. and 80% relative humidity; in terms of the thickness of 25 μm) of 300 cc/m².day.atm or smaller.

According to the present invention, there is also provided a process for producing an oriented polyglycolic acid film, comprising the steps of melt-extruding a thermoplastic resin material which comprises polyglycolic acid having a repeating unit represented by the following formula (1):

and the following physical properties:

(a) the melt viscosity, $\eta^*$ [as measured at a temperature of (the melting point, Tm of the polymer+20° C.) and a shear rate of 100/sec] being 500–100,000 Pa.s;

(b) the melting point, Tm being at least 150° C.;

(c) the melt enthalpy, $\Delta Hm$ being at least 20 J/g: and (d) the density being at least 1.50 g/cm³ as measured in an unoriented, crystallized form, through a T-die into a sheet in a temperature range of from Tm to 255° C.; immediately quenching the sheet to the crystallization temperature, $Tc_1$ of the polymer or lower; causing the quenched sheet to pass through stretching rolls in a temperature range of from the glass transition temperature, Tg of the polymer to $Tc_1$ to stretch the sheet in a uniaxial direction at a draw ratio higher than one time but not higher than 20 times; and optionally heat-setting the stretched sheet for 1 second to 3 hours in a temperature range of from $Tc_1$ to (Tm+10° C.) while maintaining its length constant, or under tension.

According to the present invention, there is further provided a process for producing an oriented polyglycolic acid film, comprising the steps of melt-extruding a thermoplastic resin material which comprises polyglycolic acid having a repeating unit represented by the following formula (1):

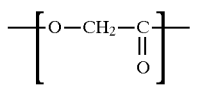

and the following physical properties:

(a) the melt viscosity, η* [as measured at a temperature of (the melting point, Tm of the polymer+20° C.) and a shear rate of 100/sec] being 500–100,000 Pa.s;

(b) the melting point, Tm being at least 150° C.;

(c) the melt enthalpy, ΔHm being at least 20 J/g; and (d) the density being at least 1.50 g/cm$^3$ as measured in an unoriented, crystallized form, through a T-die into a sheet in a temperature range of from Tm to 255° C., immediately quenching the sheet to the crystallization temperature, $Tc_1$ of the polymer or lower; causing the quenched sheet to pass through stretching rolls at a temperature ranging from the glass transition temperature, Tg of the polymer to $Tc_1$ to stretch the sheet in a machine direction at a draw ratio higher than one time but not higher than 10 times; stretching the uniaxially stretched sheet at a temperature ranging from Tg to $Tc_1$ in a transverse direction at a draw ratio higher than one time but not higher than 10 times; and optionally heat-setting the biaxially stretched sheet for 1 second to 3 hours in a temperature range of from $Tc_1$ to (Tm+10° C.) while maintaining its length constant or under tension.

According to the present invention, there is still further provided a process for producing an oriented polyglycolic acid film, comprising the steps of melt-extruding a thermoplastic resin material which comprises polyglycolic acid having a repeating unit represented by the following formula (1):

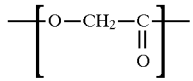

and the following physical properties:

(a) the melt viscosity, η* [as measured at a temperature of (the melting point, Tm of the polymer+20° C.) and a shear rate of 100/sec] being 500–100,000 Pa.s;

(b) the melting point, Tm being at least 150° C.;

(c) the melt enthalpy, ΔHm being at least 20 J/g; and (d) the density being at least 1.50 g/Cm$^3$ as measured in an unoriented, crystallized form, through a ring die for blown-film extrusion into a tube in a temperature range of from Tm to 255° C.; immediately quenching the sheet to the crystallization temperature, $Tc_1$ of the polymer or lower; inflating the quenched tube in such a manner that a blow-up ratio is higher than one time but not higher than 10 times; taking up the blown tube at a take-up rate of 0.5–100 m/min in a machine direction through nip rolls in such a manner that a draw ratio is higher than one time but not higher than 10 times; and optionally heat-setting the biaxially stretched tube for 1 second to 3 hours in a temperature range of from $Tc_1$ to (Tm+10° C.) while maintaining its length constant or under tension.

DETAILED DESCRIPTION OF PREFERRED EMBODIMENTS

The present invention will hereinafter be described in detail.

Structure of polymer

The polyglycolic acid useful in the practice of the present invention is a polymer having a repeating unit represented by the following formula (1):

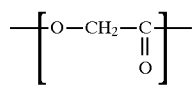

The proportion of the repeating unit represented by the formula (1) in the polymer is generally at least 70 wt. %, preferably at least 80 wt. %, more preferably 90 wt. %. If the proportion of the repeating unit represented by the formula (1) is lower than 70 wt. %, there is a possibility that the barrier properties, heat resistance, mechanical properties, resistance to heat shrinkage and the like of the resulting polymer may be deteriorated, and its degradability in soil may be impaired.

As examples of other repeating units than the repeating unit represented by the formula (1), may be mentioned a repeating unit represented by the following formula (2):

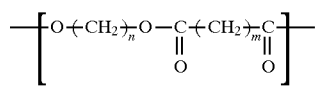

wherein n is 1–10, and m is 0–10, a repeating unit represented by the following formula (3):

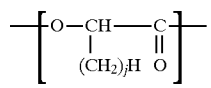

wherein j is 1–10, a repeating unit represented by the following formula (4):

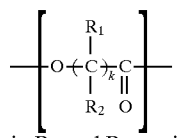

wherein $R_1$ and $R_2$ are independently a hydrogen atom or an alkyl group having 1–10 carbon atoms, and k is 2–10, and a repeating unit represented by the following formula (5):

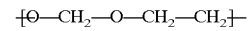

When these repeating units are introduced in a proportion of at least 1 wt. %, the melting point, Tm of the glycolic acid homopolymer can be lowered to lower the processing temperature of the polymer, whereby thermal decomposition upon melt processing can be reduced. Besides, the crystallization rate of the polyglycolic acid can be controlled by the copolymerization to improve its extrudability and stretchability. However, if the proportion of these repeating units (2) to (5) exceeds 30 wt. %, the crystallizability inherent in the polyglycolic acid is impaired, so that there is a possibility that the barrier properties, tensile modulus, tensile strength and resistance to heat shrinkage of the resulting film may be deteriorated to a marked extent.

Physical properties of polymer

<Molecular weight-melt viscosity>

The polyglycolic acid used as a raw material for the high-strength, oriented films according to the present invention is a high-molecular weight polymer. The melt viscosity of the polymer can be used as an index to its molecular weight. The polyglycolic acid used in the present invention has a melt viscosity, η* of 500–100,000 Pa.s, preferably 1,000–50,000 Pa.s, more preferably 1,500–20,000 Pa.s as measured at a temperature of (Tm+20° C.) (i.e., a temperature corresponding to a usual melt-processing temperature) and a shear rate of 100/sec.

If the melt viscosity, η* of the polyglycolic acid is lower than 500 Pa.s, there is a possibility that a melt of the polymer may undergo drawdown upon its melt-forming into a film, a resin film may be broken upon its stretching or blown-film extrusion, resulting in difficulty in melt processing, or the mechanical strength of the resulting oriented film may become insufficient. If the melt viscosity, η* of the polyglycolic acid is higher than 100,000 Pa.s, its melt processing requires a higher temperature, and there is a possibility that the polyglycolic acid may undergo heat deterioration upon the processing.

<Thermal properties>

The melting point, Tm of the polyglycolic acid useful in the practice of the present invention is at least 150° C., preferably at least 190° C., more preferably at least 210° C. The melt enthalpy, ΔHm of the polyglycolic acid used in the present invention is at least 20 J/g, preferably at least 30 J/g, more preferably 40 J/g.

Polyglycolic acid having a Tm lower than 150° C. and/or a ΔHm smaller than 20 J/g is considered to be such that its degree of crystallinity is lowered due to the disorder of its intramolecular chemical structure, and consequently the Tm and/or ΔHm may be lowered. Accordingly, an oriented film formed from such a polyglycolic acid has a possibility that the mechanical strength may be insufficient, the barrier properties may be low, and the heat resistance may also be insufficient.

<Density>

The polyglycolic acid used in the present invention has a density of at least 1.50 g/cm$^3$, preferably 1.52 g/cm$^3$, more preferably 1.53 g/cm$^3$ as measured in an unoriented, crystallized form. Low-density polyglycolic acid having a density lower than 1.50 g/cm$^3$ is considered to be such that its degree of crystallinity is lowered due to the disorder of its intramolecular chemical structure, and consequently the density may be lowered. Accordingly, an oriented film formed from such a polyglycolic acid has a possibility that the degree of crystallinity may be low, and the tensile strength, tensile modulus, barrier properties and heat resistance may be insufficient.

General properties of oriented film

<Tensile strength>

The oriented films according to the present invention formed from the thermoplastic resin material comprising the above-described specific polyglycolic acid are films having sufficiently high strength from the viewpoint of practical use. More specifically, the oriented films according to the present invention are extremely tough films having tensile strength of at least 150 MPa, preferably at least 200 MPa, more preferably at least 250 MPa, and often at least 400 MPa. If the resulting film has tensile strength lower than 150 MPa, there is a possibility that its strength may become insufficient from the viewpoint of practical use.

<Thickness>

The high-strength, oriented films according to the present invention each have a thickness of generally 1–500 μm, preferably 3–300 μm, more preferably 5–200 μm. Any film having a thickness smaller than 1 μm is not preferable because the film is easy to be broken upon its stretching by stretching rolls, a tenter or blown-film extension and hence is difficult to produce, and moreover involves such problems that it is limp and easy to be broken.

On the other hand, any oriented film having a thickness exceeding 500 μm is also not preferable because stretching in the course of its production requires enormous stress and hence a special apparatus and involves a problem that it is too hard to use in barrier materials, carrier bags, refuse sacks, wrapping films and the like and difficult to handle.

<Degradability in soil>

The high-strength, oriented films according to the present invention are soil-degradable films which scarcely impose burden on the environment. More specifically, when the oriented polyglycolic acid films according to the present invention are buried at the depth of 10 cm under the ground, they are degraded within generally 24 months, preferably 12 months to lose their original forms. In the case of, for example, the conventional polylactic acid film, there has been a problem that since the glass transition temperature Tg of polylactic acid is too high, the film is difficult to be composted under ordinary conditions. On the other hand, the oriented films according to the present invention are formed from the polyglycolic acid the Tg of which is not very high, so that it is possible to compost them under ordinary conditions.

<Transparency>

The high-strength, oriented films according to the present invention are substantially colorless and have high transparency and an extremely low haze when an inorganic filler is not added or added in only a small amount.

Barrier film

It is possible to provide an oriented film having a very low oxygen permeability by using the thermoplastic resin material comprising the specific polyglycolic acid described above. More specifically, the present invention can provide an oriented film having high barrier properties as demonstrated by its oxygen permeability (as measured at a temperature of 23° C. and 80% relative humidity in accordance with JIS K 7126; in terms of the thickness of 25 μm) of generally 50 cc/m$^2$.day.atm or smaller, preferably 30 cc/m$^2$.day.atm or smaller, more preferably 10 cc/m$^2$.day.atm or smaller.

The oriented films according to the present invention are also excellent in carbon dioxide barrier property and have a carbon dioxide permeability (as measured at a temperature of 23° C. and 80% relative humidity in accordance with JIS K 7126; in terms of the thickness of 25 μm) of generally 300 cc/m$^2$.day.atm or smaller, preferably 100 cc/m$^2$.day.atm or smaller, more preferably 30 cc/m$^2$.day.atm or smaller.

The oriented films according to the present invention are good in water vapor barrier property and have a water vapor permeability (as measured at a temperature of 40° C. and 90% relative humidity in accordance with JIS Z 0208; in terms of the thickness of 25 μm) of generally 100 g/m$^2$.day or smaller, preferably 50 g/m$^2$.day or smaller, more preferably 30 g/m$^2$.day or smaller.

As described above, the oriented films according to the present invention have extremely higher barrier properties compared with the conventional biodegradable or soil-degradable films. The oriented films according to the present invention have a high level of barrier properties comparable to those of the barrier films (for examples, polyamide films, polyethylene terephthalate films, polyvinylidene chloride films and ethylene-vinyl alcohol copolymer films) commonly used in fields of packaging materials and the like. Besides, the oriented films according to the present invention can maintain good barrier properties even under high-humidity conditions of about 90% relative humidity (RH).

Since the oriented films of the present invention have high barrier properties, they can be used as high barrier films in the application fields of food packaging and the like either singly or by optionally providing thereon a layer of a water-vaporproof coating (for example, a coating of a vinyl chloride-vinyl acetate copolymer or vinylidene chloride-acrylonitrile copolymer) or a water-vaporproof laminate layer (for example, a polyolefin laminate layer).

High-tensile modulus film

It is possible to provide an oriented film having an extremely high tensile modulus by using the thermoplastic resin material comprising the specific polyglycolic acid described above. More specifically, the present invention can provide an oriented film having a high tensile modulus of generally at least 4.0 GPa, preferably at least 5.5 GPa, more preferably at least 7.0 GPa. The film having such a high tensile modulus is unique in the conventional biodegradable or soil-degradable films and is equal to or better than the conventional high-tensile modulus films (for example, polyethylene terephthalate, polyolefin and polyamide films) commonly used.

The oriented films according to the present invention can be provided as extremely thin films with the cooperation of high modulus and high strength. The oriented films of the present invention are sufficiently stiff and tough even when provided as thin films having a thickness of, for example, about 15 $\mu$m or smaller. The formation of the thin film permits a considerable reduction in weight per unit area of the film and the provision of a soil-degradable film at low cost.

The oriented films according to the present invention can be suitably used in application fields in which they are used while maintaining irregularities and stereostructures of objects to be packed, for example, as food packaging materials, doll cases, egg cartons, garment packaging materials, flower packaging materials, vegetable and fruit packaging materials, and cushioning materials, making good use of their high-tensile modulus feature.

Any oriented film having a tensile modulus lower than 4.0 GPa and/or a tensile strength lower than 150 MPa has a possibility that it may become easy to be broken or easy to be elongated due to its limpness when it is provided as a thin film.

Heat shrinkage-resistant film

According to the present invention, there can be provided an oriented film having a heat shrinkage (as measured at 130° C. for 10 minutes) as low as generally at most 30%, preferably at most 20%, more preferably at most 10%. The film having such a low heat shrinkage is suitable for use in application fields in which they are used at a high temperature, for example, as wrapping materials and trays used in electronic ranges, containers for instant food eatable by pouring boiling water therein, packaging materials for retort food and medical instruments, of which high temperature sterilization is required.

Any film having a heat shrinkage exceeding 30% at 130° C. generally undergoes too great deformation when used at a high temperature of not lower than 130° C.

High-lubricity film

The oriented polyglycolic acid films according to the present invention are high in strength and hence easy to provide as thin films. However, when a thin film having a thickness of about 15 $\mu$m or smaller is provided, frictional force between the thin film and another film or between the film and the surface of a metal becomes a problem in winding and rewinding operations upon the production and processing of such a film, or in winding and rewinding operations upon use when used as a tape. Namely, if the frictional force is too great, the film is broken or wrinkled in the course of the winding or rewinding operation, resulting in difficulty in conducting these operations.

When a thermoplastic resin material comprising powder of an inorganic material in a proportion of 0.01–5 parts by weight, preferably 0.02–3 parts by weight, more preferably 0.03–2 parts by weight per 100 parts by weight of the specific polyglycolic acid described above is used, a high-lubricity film having a coefficient of dynamic friction, $\mu_k$ (at 23° C.) against another film of 0.35 or smaller, preferably 0.33 or smaller, more preferably 0.30 or smaller can be obtained.

Examples of the inorganic material include silica, alumina, silica-alumina, zirconia, titanium oxide, iron oxide, calcium carbonate, calcium silicate, calcium phosphate, calcium sulfate, magnesium carbonate, magnesium silicate, magnesium phosphate, magnesium sulfate, kaolin, talc, glass and mixtures of two or more of these materials.

Easily printable film

When a thermoplastic resin material comprising powder of an inorganic material in a proportion of 0.5–100 parts by weight per 100 parts by weight of the specific polyglycolic acid is used to form an unstretched film, and the unstretched film is uniaxially or biaxially stretched at least 3 times, preferably at least 4 times in terms of an area ratio, an oriented film receptive to printing inks and excellent in printability can be obtained.

Examples of the inorganic material include silica, alumina, silica-alumina, zirconia, titanium oxide, iron oxide, calcium carbonate, calcium silicate, calcium phosphate, calcium sulfate, magnesium carbonate, magnesium silicate, magnesium phosphate, magnesium sulfate, kaolin, talc, mica, ferrite, silicon, silicon nitride, glass and mixtures of two or more of these materials.

Production process of oriented film

<Raw polymer>

The polyglycolic acid used as a raw material of the high-strength, oriented films according to the present invention can be prepared by the following process.

(1) The polyglycolic acid can be obtained by heating glycolide (i.e., 1,4-dioxane-2,5-dione) to a temperature of about 120° C. to about 250° C. in the presence of a small amount of a catalyst (for example, a cationic catalyst such as a tin organic carboxylate, tin halide or antimony halide), thereby subjecting it to ring-opening polymerization. The ring-opening polymerization is preferably conducted by a bulk polymerization process or solution polymerization process. (2) The polyglycolic acid can be obtained by a polycondensation process wherein glycolic acid or an alkyl glycolate is heated in the presence or absence of a catalyst, thereby subjecting it to dehydration or dealcoholization.

In order to obtain a glycolic acid copolymer, it is only necessary to copolymerize glycolide, glycolic acid or an alkyl glycolate in accordance with the above process (1) or (2) in suitable combination with, as a comonomer, for example, a cyclic monomer such as ethylene oxalate (i.e., 1,4-dioxane-2,3-dione), lactide, a lactone (for example, $\beta$-propiolactone, $\beta$-butyrolactone, pivalolactone, $\gamma$-butyrolactone, $\delta$-valerolactone, $\beta$-methyl-$\delta$-valerolactone or $\epsilon$-caprolactone), trimethylene carbonate or 1,3-dioxane; a hydroxycarboxylic acid such as lactic acid, 3-hydroxypropanoic acid, 3-hydroxy-butanoic acid, 4-hydroxybutanoic acid or 6-hydroxycaproic acid or an alkyl ester thereof; a substantially equimolar mixture of an aliphatic diol such as ethylene glycol or 1,4-butanediol and, an aliphatic dicarboxylic acid such as succinic acid or adipic acid or an alkyl ester thereof; or two or more compounds thereof. The glycolic acid copolymer may be that obtained by subjecting the polyglycolic acid and another polymer having repeating units selected from among the formulae (2) to (4) to transesterification under heat. Of the above preparation processes, the process (1) in which glycolide is subjected to ring-opening polymerization is preferred because a high-molecular weight polyglycolic acid is easy to be obtained.

As the glycolide used as a monomer in the process (1), glycolide obtained by "a solution-phase depolymerization process" (Japanese Patent Application No. 48000/1996) developed by the present inventors is preferred to that obtained by the conventional sublimation depolymerization process of a glycolic acid oligomer because a high-purity product can be mass-produced at a higher yield. The use of high-purity glycolide as a monomer permits the easy provision of high-molecular weight polyglycolic acid.

The solution-phase depolymerization process is performed by (1) heating a mixture containing a glycolic acid oligomer and at least one high-boiling polar organic solvent having a boiling point within a range of 230°–450° C. to a temperature, at which the depolymerization of the oligomer takes place, under ordinary pressure or under reduced pressure; (2) dissolving the oligomer in the solvent until a residual rate (volume ratio) of a melt phase of the oligomer reaches 0.5 or lower; (3) further continuing the heating at the same temperature to depolymerize the oligomer; (4) distilling out a dimeric cyclic ester (i.e., glycolide) formed together with the high-boiling polar organic solvent; and (5) recovering glycolide from the distillate.

Examples of the high-boiling polar organic solvent include aromatic carboxylic acid esters, such as bis (alkoxyalkyl)phthalates such as di(2-methoxyethyl) phthalate, alkylene glycol dibenzoates such as diethylene glycol dibenzoate, benzylbutyl phthalate, and dibutyl phthalate; and aromatic phosphoric acid esters such as tricresyl phosphate. The high-boiling polar organic solvent is used in a proportion of generally 0.3–50 times (weight ratio) to the oligomer. Polypropylene glycol, polyethylene glycol, tetraethylene glycol or the like may be used as a solubilizing agent for the oligomer in combination with the high-boiling polar organic solvent as needed. The depolymerization of the glycolic acid oligomer is generally conducted at 230° C. or higher, preferably 230°–320° C. Although the depolymerization is performed under atmospheric pressure or reduced pressure, it is preferable to heat the oligomer under reduced pressure of 0.1–90.0 kPa (1–900 mbar) to depolymerize it.

<Thermoplastic resin material>

In the present invention, the thermoplastic resin material comprising the specific polyglycolic acid described above is used as a raw material for the oriented film. A neat resin of the polyglycolic acid can be used as the thermoplastic resin material by itself. A composition obtained by incorporating inorganic fillers, other thermoplastic resins, plasticizers and the like into the polyglycolic acid within limits not impeding the objects of the present invention may also be used as the thermoplastic resin material. More specifically, there may be used a composition (compound) obtained by incorporating the inorganic fillers, other thermoplastic resins and plasticizers in proportions of 0–100 parts by weight, 0–100 parts by weight and 0–200 parts by weight, respectively, per 100 parts by weight of the polyglycolic acid. If the inorganic fillers or other thermoplastic resins are used in a proportion exceeding 100 parts by weight, or the plasticizers are used in a proportion exceeding 200 parts by weight, there is a possible problem that the barrier properties, tensile modulus, tensile strength and resistance to heat shrinkage of the resulting film may become insufficient, or the melt processability of the composition may be deteriorated.

Examples of the inorganic fillers include powders, whiskers and fibers of inorganic materials such as alumina, silica, silica-alumina, zirconia, titanium oxide, iron oxide, boron oxide, calcium carbonate, calcium silicate, calcium phosphate, calcium sulfate, magnesium carbonate, magnesium silicate, magnesium phosphate, magnesium sulfate, kaolin, talc, mica, ferrite, carbon, silicon, silicon nitride, molybdenum disulfide, glass and potassium titanate. These inorganic fillers may be used either singly or in any combination thereof. Although the inorganic fillers are generally used in a proportion of 0–100 parts by weight per 100 parts by weight of the polyglycolic acid, it is desirable to use them in a range of 0.01–10 parts by weight, preferably 0.05–5 parts by weight taking film-forming property, barrier properties, strength and the like into consideration. In order to obtain a high-lubricity film or a film having excellent printability, as described above, it is preferable to incorporate powder of an inorganic material within the limits of a proper amount.

Examples of the other thermoplastic resins include a homopolymer and copolymers of lactic acid, a homopolymer and copolymers of ethylene oxalate, a homopolymer and copolymers of ε-caprolactone, polysuccinates, polyhydroxybutanoic acid, hydroxybutanoic acid-hydroxyvaleric acid copolymers, cellulose acetate, polyvinyl alcohol, starch, polyglutamates, natural rubber, polyethylene, polypropylene, styrene-butadiene copolymer rubber, acrylonitrile-butadiene copolymer rubber, polymethyl methacrylate, polystyrene, styrene-butadiene-styrene block copolymers, styrene-ethylene.butylene-styrene block copolymers, ABS resins, MBS resins and ethylene-vinyl alcohol copolymers. These thermoplastic resins may be used either singly or in any combination thereof. Although these thermoplastic resins are generally used in a proportion of 0–100 parts by weight per 100 parts by weight of the polyglycolic acid, it is desirable to use them in a proportion of at most 50 parts by weight, preferably at most 30 parts by weight taking film-forming property, high strength, high modulus, barrier properties and degradability in soil into consideration.

Examples of the plasticizers include phthalates such as di(methoxyethyl)phthalate, dioctyl phthalate, diethyl phthalate and benzylbutyl phthalate; benzoates such as diethylene glycol dibenzoate and ethylene glycol dibenzoate; aliphatic dibasic acid esters such as octyl adipate and octyl sebacate; aliphatic tribasic acid esters such as tributyl acetylcitrate; phosphates such as dioctyl phosphate and tricresyl phosphate; epoxy plasticizers such as epoxidized soybean oil; and polyalkylene glycol esters such as polyethylene glycol sebacate and polypropylene glycol laurate. These plasticizers may be used either singly or in any combination thereof. Although the plasticizers are generally used in a proportion of 0–200 parts by weight per 100 parts by weight of the polyglycolic acid, it is desirable to use them in a proportion of at most 100 parts by weight, preferably at most 50 parts by weight taking film-forming property, barrier properties, high modulus, high strength and resistance to heat shrinkage into consideration.

In the present invention, various additives such as heat stabilizers, light stabilizers, moistureproofing agents, waterproofing agents, water repellents, lubricants, releasing agents, coupling agents, pigments and dyes may be contained in the thermoplastic resin material as needed. These various additives are used in an effective amount as necessary for the end application intended.

The composition is prepared by a method known per se in the art by feeding the polyglycolic acid and at least one of the other components such as the inorganic fillers, thermoplastic resins, plasticizers and various additives into a kneading extruder to melt and knead them at a cylinder temperature of from Tm to 255° C. (generally, 150°–255° C.), extruding them into a strand, and cooling and chopping the strand into pellets.

<Oriented film>

The oriented films according to the present invention can be produced by melt-extruding the neat resin of the polyglycolic acid or the composition comprising the polyglycolic acid, stretching or orienting the extrudate and optionally heat-setting the stretched film. As the melting and film-forming process, there may be used processes such as uniaxial stretching, sequential biaxial stretching and simultaneous biaxial stretching by a flat-die method, and blown-film biaxial stretching by a circular-die method. Preferable examples thereof include the following processes:

(1) Roll process: a process wherein the neat resin or composition is melt-extruded through a T-die into a sheet, and the sheet is stretched in a machine direction (M direction) through stretching rolls to produce a uniaxially oriented flat film.

(2) Tenter process: a process wherein the neat resin or composition is melt-extruded through a T-die into a sheet, and the sheet is oriented in an M direction through stretching rolls and then oriented in a transverse direction (T direction) by means of a tenter to produce a biaxially oriented flat film.

(3) Blown-film extrusion process: a process wherein the neat resin or composition is melt-extruded by means of a ring die for brown-film extrusion into a tube, the tube is quenched down to a crystallization temperature, $Tc_1$ of the polymer or lower, and a gas is introduced under pressure into the tube to inflate and stretch the tube. In this process, the tube is also stretched in a machine direction through nip rolls, thereby obtaining a biaxially oriented film. Methods for quenching the tube after the melt extrusion include a method in which air is blown against the tube by an air ring, and a method in which the tube is immersed in cold water.

Of these processes, the following processes are particularly preferred as the production process of the oriented film.

<Roll process>

The thermoplastic resin material is fed to an extruder equipped with a T-die and extruded into a sheet in a temperature range of from Tm to 255° C. (generally 150°–255° C.). The sheet is immediately quenched to $Tc_1$ or lower, preferably Tg or lower by means of a cooling dram or a cooling medium. The quenched sheet is caused to pass through stretching rolls in a temperature range of from Tg to $Tc_1$ (generally 30°–120° C.), preferably from Tg to (Tg+10° C.) (generally 30°–48° C.) to stretch or orient the sheet in an M direction at a draw ratio higher than one time but not higher than 20 times (preferably 2–10 times). The stretched sheet is optionally heat set for 1 second to 3 hours (preferably 3 seconds to 0.5 hour) in a temperature range of from $Tc_1$ to (Tm+10° C.) (generally 70°–240° C.) while maintaining its length constant, or under tension, whereby a uniaxially oriented flat film can be produced. Here, $Tc_1$ means a crystallization temperature. If the extrusion temperature through the T-die into the sheet exceeds 255° C., there is a possibility that the decomposition of the polymer, and rapid decrease in molecular weight and bubbling attendant upon the decomposition may be easy to take place, resulting in a failure to obtain a sheet fit for the subsequent stretching. If the stretching temperature exceeds $Tc_1$, there is a possibility that the resulting sheet may be substantially crystallized and hence scarcely stretched or oriented. Incidentally, the resultant uniaxially oriented film may be easily formed into split yarn by splitting it in a width direction.

<Tenter process>

The thermoplastic resin material is fed to an extruder equipped with a T-die and extruded into a sheet in a temperature range of from Tm to 255° C. (generally 150°–255° C.). The sheet is immediately quenched to $Tc_1$ or lower, preferably Tg or lower by means of a cooling dram or a cooling medium. Like the roll process, the quenched sheet is then caused to pass through stretching rolls in a temperature range of from Tg to $Tc_1$ (generally 30°–120° C.), preferably from Tg to (Tg+10° C.) (generally 30°–48° C.) to stretch or orient the sheet in an M direction at a draw ratio higher than one time but not higher than 10 times (preferably 2–8 times) and then in a T direction at a draw ratio higher than one time but not higher than 10 times (preferably 2–8 times) in a temperature range of from Tg to $Tc_1$ (generally 30°–120° C.), preferably from Tg to (Tg+20° C.) (generally 30°–58° C.). The biaxially stretched sheet is optionally heat set for 1 second to 3 hours (preferably 3 seconds to 30 minutes) in a temperature range of from $Tc_1$ to (Tm+10° C.) (generally 70°–240° C.) while maintaining its length constant, or under tension, whereby a biaxially oriented flat film can be produced. If the extrusion temperature through the T-die into the sheet exceeds 255° C., there is a possibility that the decomposition of the polymer, and rapid decrease in molecular weight and bubbling attendant upon the decomposition may be easy to take place, resulting in a failure to obtain a sheet fit for the subsequent stretching. If the stretching temperature exceeds $Tc_1$, there is a possibility that the resulting sheet may be substantially crystallized and hence scarcely stretched or oriented.

<Blown-film extrusion process>

The thermoplastic resin material is fed to an extruder equipped with a ring die for blown-film extrusion and extruded into a tube in a temperature range of from Tm to 255° C. (generally 150°–255° C.). The tube is immediately quenched to $Tc_1$ or lower, preferably Tg or lower, inflated in a temperature range of from Tg to $Tc_1$ (generally 30°–120° C.), preferably from Tg to (Tg+10° C.) (generally 30°–48° C.) in such a manner that a blow-up ratio is higher than one time but not higher than 10 times (preferably 2–8 times), and taken up at a take-up rate of 0.5–100 m/min (preferably 1–50 m/min) in a machine direction through nip rolls in such a manner that a draw ratio is higher than one time but not higher than 10 times (preferably 2–8 times). The biaxially stretched tube is optionally heat set for 1 second to 3 hours (preferably 3 seconds to 0.5 hour) in a temperature range of from $Tc_1$ to (Tm+10° C.) (generally 70°–240° C.) while maintaining its length constant, or under tension, whereby a biaxially oriented flat film can be produced in the form of a tube. If the extrusion temperature into the tube exceeds 255° C., there is a possibility that the decomposition of the polymer, and rapid decrease in molecular weight and bubbling attendant upon the decomposition may be easy to take place, resulting in a failure to obtain a tube fit for the subsequent inflation. If the inflation temperature exceeds $Tc_1$, there is a possibility that the resulting tube may be substantially crystallized and hence scarcely stretched or oriented.

<Bag making>

A bag can be made by putting two oriented films according to the present invention together and heat-sealing or welding them at a temperature of from (Tm−20° C.) to (Tm+100° C.), preferably from Tm to (Tm+50° C.) for generally 0.01–100 seconds, preferably 0.1–20 seconds by means of a sealer. As the sealer, there may be used a hot knife sealer, an impulse sealer, a high-frequency sealer or an ultrasonic sealer.

<Heat-shrinkable film>

Films obtained by conducting only the stretching or orientation without performing the heat setting in the individual production processes of the oriented films according to the present invention are heat-shrinkable film having a high heat shrinkage in contrast with the above-described films having a low heat shrinkage.

Application fields

The high-strength, oriented films of polyglycolic acid according to the present invention can be used in a wide variety of fields either singly or by providing thereon a water-vaporproof coating or a water-vaporproof laminate. The oriented films can be formed for use into bags and the like.

The oriented films according to the present invention have the features of high strength, modulus, barrier properties, resistance to heat shrinkage and transparency. Application fields of the oriented films according to the present invention making good use of their high barrier properties include, for example, packaging materials for various kinds of food, packaging materials for medical instruments and wrapping films. Application fields making good use of their high modulus and strength include, for example, packaging materials for various kinds of food, wrapping films, garment packaging materials, doll packaging materials, fresh food packaging materials, vegetable packaging materials, egg cartons, cushioning materials, mulch films, carrier bags, refuse sacks, packaging materials for sanitary goods, paper diapers, pressure-sensitive adhesive tapes, magnetic tapes and floppy disks. Application fields making good use of their high resistance to heat shrinkage include, for example, wrapping films for electronic ranges, retort food packaging materials and instant food packaging materials. The films not subjected to heat setting can be used as shrinkable films. The split yarn can be used as packing and agricultural strings.

ADVANTAGES OF THE INVENTION

According to the present invention, there can be cheaply provided oriented polyglycolic acid films having excellent barrier properties, heat resistance and resistance to heat shrinkage, and practicable strength. Since the oriented films according to the present invention have the features of high strength, modulus, barrier properties, resistance to heat shrinkage and transparency, they can be used as various kinds of packaging materials, and the like in a wide variety of fields either singly or by providing thereon a water-vaporproof coating or a water-vaporproof laminate. The oriented films according to the present invention exhibit degradability in soil and hence scarcely impose burden on the environment.

EMBODIMENTS OF THE INVENTION

The present invention will hereinafter be described more specifically by the following Synthesis Examples, Examples and Comparative Examples.

Measuring methods of physical properties (1) Melt viscosity, $\eta^*$

As indices to the molecular weights of polymers, their melt viscosities, $\eta^*$ were measured. A crystallized sheet obtained by heating an amorphous sheet about 0.2 mm thick of each polymer at about 150° C. for 5 minutes was used as a sample, and the melt viscosity of the sample was measured at a temperature of (Tm+20° C.) and a shear rate of 100/sec by means of a "Capirograph" (trade name, manufactured by Toyo Seiki Seisakusho, Ltd.) equipped with a nozzle having a diameter (D) of 0.5 mm and a length (L) of 5 mm.

(2) Thermal properties of polymer

An amorphous sheet about 0.2 mm thick of each polymer was used as a sample and heated by means of a differential scanning calorimeter (DSC; TC-10A Model, manufactured by METTLER INSTRUMENT AG) at a rate of 10° C./min under a nitrogen gas stream, thereby measuring the crystallization temperature ($Tc_1$), melting point (Tm) and melt enthalpy ($\Delta$Hm) of the sample. Incidentally, the glass transition temperature (Tg) was measured at a heating rate of 5° C./min.

(3) Density of unoriented, crystallized sheet

A sheet obtained by heat-setting an amorphous sheet about 0.2 mm thick of each polymer at about 150° C. for 5 minutes was used as a sample, and the density of the sample was measured in accordance with JIS R 7222 (a pycnometer method making use of n-butanol).

(4) Thickness of film

The thicknesses of 10 points of each film sample were measured by means of a micrometer ($\mu$-mate, trade name, manufactured by SONY CORP.) to determine an average value thereof.

(5) Density of film

Aqueous zinc chloride.hydrochloric acid solutions different in specific gravity were prepared in accordance with a sink-float method by aqueous zinc chloride solutions, and pieces of each film sample were immersed therein at 20° C. to observe their sink or float states, thereby determining the density of the film sample.

(6) Tensile modulus

Using a TENSILON (trade name, manufactured by Toyo Baldwin K.K.), a strip-like specimen 10 mm wide was held by clamps so as to give a sample length of 30 mm to measure the tensile modulus of the sample at 23° C. and a cross-head speed of 10 mm/min.

(7) Tensile strength and elongation

The tensile strength and elongation of each film sample were measured in the same manner as in the measurement of the tensile modulus except that the cross-head speed was changed to 100 mm/min.

(8) Heat shrinkage

One end of a strip-like specimen 10 mm wide was held by a clip. The specimen was cut to an even length in such a manner that a free sample length was 50 mm, and suspended for 10 minutes in an air-circulating Geer's oven heated to 130° C. to heat it. Thereafter, the specimen was taken out of the Geer's oven to measure its length, thereby determining its shrinkage.

(9) Oxygen permeability ($O_2$ permeability)

The oxygen permeability of each film sample was measured at 23° C. and 80% RH in accordance with JIS K 7126 by means of a double-side moistening gas permeability tester manufactured by GL Sciences Inc., and the measured value was converted into a value in a film thickness of 25 $\mu$m.

(10) Carbon dioxide permeability ($CO_2$ permeability)

The carbon dioxide permeability of each film sample was measured at 23° C. and 80% RH in accordance with JIS K 7126 by means of a double-side moistening gas permeability tester manufactured by GL Sciences Inc., and the measured value was converted into a value in a film thickness of 25 $\mu$m.

(11) Water vapor permeability

The water vapor permeability of each film sample was measured at a temperature of 40° C. and 90% RH in accordance with JIS Z 0208 by means of a PERMATRON-W3/30 manufactured by MODERN CONTROL CO., and the measured value was converted into a value in a film thickness of 25 μm.

(12) Degradability in soil

Each film sample was cut into strips about 3 cm wide and buried at the depth of 10 cm under the ground of a plowland. The strips were dug up at intervals of a half month to observe their shapes. The time the shape of the strip began to deform was observed, whereby the film sample was ranked as being soil-degradable where the shape of the strip began to degrade within 24 months after buried under ground.

[Synthesis Example 1]

Synthesis of monomer

A 10-liter autoclave was charged with 5 kg of glycolic acid (product of Wako Pure Chemical Industries, Ltd.). While stirring, the temperature of the contents was raised from 170° C. to 200° C. over about 2 hours to heat them, whereby glycolic acid was condensed while distilling off water formed. The pressures inside the autoclave was then reduced to 20 kPa (200 mbar), and the reaction mixture was held for 2 hours under such a pressure, thereby distilling off low-boiling matter to prepare a glycolic acid oligomer. The melting point, Tm of the thus-obtained oligomer was 205° C.

A 10-liter flask was charged with 1.2 kg of the glycolic acid oligomer, and 5 kg of benzylbutyl phthalate (product of Junsei Chemical Co., Ltd.) as a solvent and 150 g of polypropylene glycol (#400, product of Junsei Chemical Co., Ltd.) as a solubilizing agent were added. The mixture was heated to 270° C. under reduced pressure of 5.0 kPa (50 mbar) in a nitrogen gas atmosphere to conduct "solution-phase depolymerization" of the oligomer. Glycolide formed was distilled out together with benzylbutyl phthalate.

Cyclohexane about twice as much as the distillate by volume was added to the distillate collected, whereby glycolide was crystallized from benzylbutyl phthalate and collected by filtration. The glycolide thus obtained was recrystallized from ethyl acetate and dried for two nights at room temperature under reduced pressure of about 1 kPa, thereby obtaining glycolide at a yield of about 80%.

[Polymer Preparation Example 1]

A PFA-made cylinder was charged with 200 g of glycolide obtained in Synthesis Example 1, and the glycolide was dried at room temperature for about 30 minutes while introducing nitrogen gas. Then, 0.04 g of $SnCl_4 \cdot 6.5H_2O$ as a catalyst was added, and the contents were held at 170° C. for 2 hours while introducing nitrogen gas therein, thereby polymerizing glycolide. After completion of the polymerization, the cylinder was cooled down to room temperature, and a bulk polymer taken out of the cylinder was ground into fine particles having a particle size of about 3 mm or smaller. The fine particles were dried overnight at about 150° C. under reduced pressure of about 0.1 kPa to remove a remaining monomer, thereby obtaining polyglycolic acid [Polymer (P-1)]. The same process was conducted repeatedly to produce a necessary amount of Polymer (P-1).

[Polymer Preparation Example 2]

Polymerization and post-treatment were performed in the same manner as in Polymer Preparation Example 1 except that a mixture of 196 g of glycolide and 4 g of ethylene oxalate (1,4-dioxane-2,3-dione) was used in place of 200 g of glycolide, thereby obtaining a glycolic acid-ethylene oxalate copolymer [Polymer (P-2)]. The same process was conducted repeatedly to prepare a necessary amount of Polymer (P-2).

[Polymer Preparation Example 3]

Polymerization and post-treatment were performed in the same manner as in Polymer Preparation Example 1 except that a mixture of 196 g of glycolide and 4 g of L-(−)-lactide was used in place of 200 g of glycolide, thereby obtaining a glycolic acid-lactide copolymer [Polymer (P-3)]. The same process was conducted repeatedly to prepare a necessary amount of Polymer (P-3).

[Polymer Preparation Example 4]

L-(−)-Lactide (product of Tokyo Kasei Kogyo Co., Ltd.) was recrystallized from ethanol to purify it. A PFA-made cylinder was charged with 200 g of the purified L-(−)-lactide, and the lactide was dried at room temperature for about 30 minutes while introducing nitrogen gas. Then, 0.05 g of tin octanoate as a catalyst was added, and the contents were held at 130° C. for 15 hours while introducing nitrogen gas therein, thereby polymerizing the lactide. After completion of the polymerization, the cylinder was cooled down to room temperature, and a bulk polymer taken out of the cylinder was ground into fine particles having a particle size of about 3 mm or smaller. The fine particles were dried overnight at about 100° C. under reduced pressure of about 0.1 kPa to remove a remaining monomer, thereby obtaining polylactide [Polymer (CP-1)]. The same process was conducted repeatedly to produce a necessary amount of Polymer (CP-1).

[Polymer Preparation Example 5]

Added to glycolic acid were 0.1 wt. % of triphenyl phosphite and 0.01 wt. % of antimony trioxide. The mixture was heated at 200° C. for about 1.5 hours while introducing nitrogen gas to dehydrate it. The pressure of the reaction system was then reduced to 0.1–0.6 kPa over about 0.7 hour. A stirring blade was then inserted, and the mixture was heated up to 220° C. over about 0.7 hour with stirring under reduced pressure of 0.1–0.6 kPa. The stirring was continued for 11 hours while raising the degree of vacuum as high as possible, during which the mixture was heated to 245° C. if a polymer formed was solidified, thereby melting the polymer.

The resulting crude polymer was ground and sifted through a 20-mesh screen, charged into a flask and heated to remelt. While stirring under reduced pressure, the melt was further heated at 218° C. for 24 hours to turn remaining glycolide out of the melt, thereby obtaining a direct polycondensation type polyglycolic acid [Polymer (CP-2)] at a yield of about 60%.

The results of Polymer Preparation Example 1–5 are shown in Table 1.

TABLE 1

| | Polymer Preparation Example | | | | |
|---|---|---|---|---|---|
| | 1 | 2 | 3 | 4 | 5 |
| Composition of[*1] Monomer (wt/wt) | GA | GA/EX = 98/2 | GA/LA = 98/2 | LA | GA |
| Polymer code | P-1 | P-2 | P-3 | CP-1 | CP-2 |
| η* (Pa · s) | 4,000 | 4,300 | 4,200 | 3,500 | 200 |
| Thermal Properties | | | | | |
| Tg (°C.) | 38 | 38 | 37 | 52 | 37 |
| Tc$_1$ (°C.) | 84 | 77 | 73 | 107 | 90 |
| Tm (°C.) | 220 | 219 | 219 | 174 | 220 |
| ΔHm (J/g) | 70 | 72 | 70 | 54 | 59 |
| Density of crystallized product (g/cm$^3$) | 1.58 | 1.58 | 1.58 | 1.26 | 1.57 |
| Remarks | ROP[*2] | ROP[*2] | ROP[*2] | ROP[*2] | CP[*3] |

[*1]: GA = Glycolide; Ex = Ethylene oxalate, LA = Lactide.
[*2]: ROP = Ring opening polymerization.
[*3]: CP = Condensation polymerization.

[Pellet Preparation Example 1]

A small twin-screw extruder equipped with a nozzle having a diameter of 3 mm was charged with a mixture of 100 parts by weight of Polymer (P-1) and 0.1 part by weight of alumina powder under a nitrogen gas stream. The mixture was extruded into a strand at a melt temperature of about 230° C. to about 235° C. The strand was quenched and chopped to obtain Pellet (No. 1).

[Pellet Preparation Example 2]

A small twin-screw extruder equipped with a nozzle having a diameter of 3 mm was charged with a mixture of 100 parts by weight of Polymer (P-2) and 0.1 part by weight of silica powder under a nitrogen gas stream. The mixture was extruded into a strand at a melt temperature of about 225° C. to about 230° C. The strand was quenched and chopped to obtain Pellet (No. 2).

[Pellet Preparation Example 3]

A small twin-screw extruder equipped with a nozzle having a diameter of 3 mm was charged with a mixture of 100 parts by weight of Polymer (P-3) and 0.1 part by weight of talc powder under a nitrogen gas stream. The mixture was extruded into a strand at a melt temperature of about 230° C. to about 235° C. The strand was quenched and chopped to obtain Pellet (No. 3).

[Pellet Preparation Example 4]

A small twin-screw extruder equipped with a nozzle having a diameter of 3 mm was charged with Polymer (P-1) under a nitrogen gas stream. The polymer was extruded into a strand at a melt temperature of about 230° C. to about 235° C. The strand was quenched and chopped to obtain Pellet (No. 4).

[Pellet Preparation Example 5]

A small twin-screw extruder equipped with a nozzle having a diameter of 3 mm was charged with a mixture of 100 parts by weight of Polymer (P-2) and 5 parts by weight of alumina powder under a nitrogen gas stream. The mixture was extruded into a strand at a melt temperature of about 225° C. to about 230° C. The strand was quenched and chopped to obtain Pellet (No. 5).

[Pellet Preparation Example 6]

A small twin-screw extruder equipped with a nozzle having a diameter of 3 mm was charged with Polymer (CP-1) under a nitrogen gas stream. The polymer was extruded into a strand at a melt temperature of about 185° C. to about 190° C. The strand was quenched and chopped to obtain Pellet (No. C1).

[Pellet Preparation Example 7]

A small twin-screw extruder equipped with a nozzle having a diameter of 3 mm was charged with Polymer (CP-2) under a nitrogen gas stream. The polymer was extruded into a strand at a melt temperature of about 230° C. to about 235° C. The strand was quenched and chopped to obtain Pellet (No. C2).

[EXAMPLE 1]

Using a portion of Pellet (No. 1) obtained in Pellet Preparation Example 1 and a hot press, the pellets were heated and pressed at about 250° C. for about 20 seconds, and the resultant pressed sheet was then quenched by a cold press, thereby producing an amorphous film having a thickness of about 0.15–0.2 mm.

This film was stretched each 3 times in one direction and in another direction at about 42°–44° C. by means of a small biaxial stretcher (manufactured by Toyo Seiki Seisakusho, Ltd.). The stretched film thus obtained was fixed to a metal frame to heat set at 150° C. for 1 minute, thereby obtaining Biaxially Oriented Film (F1-1).

[EXAMPLE 2]

Biaxially Oriented Film (F2-1) was obtained in the same manner as in Example 1 except that a portion of Pellet (No. 2) obtained in Pellet Preparation Example 2 was used.

[EXAMPLE 3]

Biaxially Oriented Film (F3-1) was obtained in the same manner as in Example 1 except that a portion of Pellet (No. 3) obtained in Pellet Preparation Example 3 was used.

[EXAMPLE 4]

Biaxially Oriented Film (F4-1) was obtained in the same manner as in Example 1 except that a portion of Pellet (No. 4) obtained in Pellet Preparation Example 4 was used.

[EXAMPLE 5]

A portion of Pellet (No. 1) obtained in Pellet Preparation Example 1 was used to produce an amorphous film in the same manner as in Example 1. This film was then stretched 7 times in one direction at about 42°–44° C. by means of a TENSILON (trade name, manufactured by Toyo Baldwin K.K.). The stretched film thus obtained was heat set at 150° C. for 1 minute while maintaining its length constant, thereby obtaining Uniaxially Oriented Film (F1-2).

[Comparative Example 1]

Using a portion of Pellet (No. C1) obtained in Pellet Preparation Example 6 and a hot press, the pellets were heated and pressed at about 200° C., and the resultant pressed sheet was then quenched by a cold press, thereby producing an amorphous film having a thickness of about 0.15–0.2 mm. This film was stretched each 3 times in one direction and in another direction at about 60° C. The stretched film thus obtained was fixed to a metal frame to heat set at 150° C. for 1 minute, thereby obtaining Biaxially Oriented Film (FC1-1).

[Comparative Example 2]

Using a portion of Pellet (No. C2) obtained in Pellet Preparation Example 7, an amorphous film having a thickness of about 76 µm (3 mil) was produced in the same manner as in Example 1. This film was stretched 3 times in one direction at 50° C. and 2 times in another direction at about 50° C. The stretched film thus obtained was subjected to a heat treatment at 50° C. for 3 hours while maintaining its length constant, thereby obtaining Biaxially Oriented Film (FC2-1). Incidentally, the amorphous film was easy to be broken during the stretching, so that the yield of the biaxially oriented film was extremely low. The reason for it was considered to be attributable to the fact that the polymer was that obtained by the direct polycondensation, and its stretching temperature was a little too high.

[EXAMPLE 6]

A portion of Pellet (No. 1) obtained by incorporating the alumina powder (lubricant) into Polymer (P-1) was charged into a small twin-screw extruder equipped with a ring die for blown-film extrusion under a nitrogen gas stream and extruded into a tube at a resin temperature of about 230° C. through the ring die. The tube was then quenched to below Tg in a cooling bath and inflated at about 42°–44° C. and a blow-up ratio of about 3 times. A take-up rate was controlled in such a manner that the draw ratio in the machine direction of the tube was about 3 times, whereby the tube was taken up through nip rolls to produce a tubular film. This film was heat set at 150° C. for 1 minute to obtain Biaxially Oriented Film (F1-3).

[EXAMPLE 7]

Biaxially Oriented Film (F4-2) was produced in the same manner as in Example 6 except that a portion of Pellet (No. 4) obtained by incorporating no inorganic powder (lubricant) into Polymer (P-1) was used.

Although the same Polymer (P-1) was used, Film (F1-3) of Example 6 containing the lubricant was able to be smoothly wound or rewound by a machine, while Film (F4-2) of Example 7 containing no lubricant tended to cause sticking between films or between the film and the surface of a metal upon winding or rewinding by a machine and was easy to be wrinkled or broken. The coefficient of dynamic friction, $\mu_K$ of Film (F1-3) of Example 6 was 0.23, while the $\mu_K$ of Film (F4-2) of Example 7 was 0.39. The coefficient of dynamic friction, $\mu_K$ was measured at 23° C. against another film of the same kind as the sample film in accordance with JIS K 7215.

[EXAMPLE 8]

A portion of Pellet (No. 1) was used and charged into a small extruder equipped with a coathanger type T-die under a nitrogen gas stream to extrude it at a resin melt temperature of about 230° C. into a sheet. The molten sheet was quenched down to bellow Tg on the surface of a cooling roll (surface temperature: 3°–5° C.) equipped with a pinning device capable of applying a static potential of 5 kV. The quenched raw sheet was caused to pass through stretching rolls via guide rolls, thereby stretching it about 3 times in an M direction at about 42°–44° C. The uniaxially stretched sheet was then stretched about 3 times in a T direction at the same temperature by means of a tenter and taken up. A portion of the wound film was rewound and fixed to a metal frame, thereby heat setting it at 150° C. for 1 minute to obtain Biaxially Oriented Film (F1-4).

[Comparative Example 3]

Biaxial stretching according to the tenter process was attempted in the same manner as in Example 8 except that the resin temperature upon the extrusion of Pellet (No. 1) into the sheet was changed to 280° C. However, the resin temperature of 280° C. far exceeds the decomposition temperature of polyglycolic acid, so that the resin underwent rapid decomposition in the cylinder of the extruder, resulting in a failure to obtain a sheet fit for the subsequent stretching. Therefore, the stretching was stopped.

Thus, the melt extrusion was conducted at a resin temperature of 230° C. like Example 8 so as to prevent the resin from being decomposed, thereby obtaining a sheet. Further, biaxial stretching according to the tenter process was attempted in the same manner as in Example 8 except that the stretching temperature of the sheet was changed to 160° C. However, the stretching temperature far exceeds the crystallization temperature, $Tc_1$ (about 80° C.) of polyglycolic acid, so that the sheet was highly crystallized before the sheet was stretched in the machine direction, and so the stretching in the machine direction was scarcely feasible. Since stretching in the transverse direction was naturally impossible, the biaxial stretching was stopped.

The results of these Examples and Comparative Examples are shown in Table 2.

TABLE 2

|  |  | Example |  |  |  |  |  |  |  | Comp. Example |  |  |
|---|---|---|---|---|---|---|---|---|---|---|---|---|
|  |  | 1 | 2 | 3 | 4 | 5 | 6 | 7 | 8 | 1 | 2 | 3 |
| Polymer code |  | P-1 | P-2 | P-3 | P-1 | P-1 | P-1 | P-1 | P-1 | CP-1 | CP-2 | P-1 |
| Composition | Kind of additive | $Al_2O_3$ | $SiO_2$ | Talc | — | $Al_2O_3$ | $Al_2O_3$ | — | $Al_2O_3$ | — | — | $Al_2O_3$ |
|  | Amount added (pbw) | 0.1 | 0.1 | 0.1 | — | 0.1 | 0.1 | — | 0.1 | — | — | 0.1 |
|  | Pellet code | 1 | 2 | 3 | 4 | 1 | 1 | 4 | 1 | C1 | C2 | 1 |
| Physical properties of film | Film code | F1-1 | F2-1 | F3-1 | F4-1 | F1-2 | F1-3 | F4-2 | F1-4 | FC1-1 | FC2-1 | — |
|  | Draw ratio (times) | 3 × 3 | 3 × 3 | 3 × 3 | 3 × 3 | 7 × 0 | 3 × 3 | 3 × 3 | 3 × 3 | 3 × 3 | 2 × 3 | — |
|  | Thickness (µm) | 16 | 17 | 15 | 14 | 30 | 15 | 14 | 17 | 20 | 17 | — |
|  | Density (g/cm³) | 1.60 | 1.59 | 1.59 | 1.60 | 1.60 | 1.60 | 1.60 | 1.60 | 1.27 | 1.58 | — |
|  | Tensile modulus (GPa) | 9.5 | 9.0 | 9.3 | 9.7 | 8.5 | 9.4 | 9.5 | 9.8 | 4.2 | 8.5 | — |
|  | Tensile strength (MPa) | 460 | 400 | 430 | 480 | 500 | 450 | 430 | 450 | 125 | 50 | — |
|  | Elongation (%) | 80 | 50 | 46 | 55 | 30 | 51 | 50 | 52 | 85 | 3 | — |

TABLE 2-continued

| | | Example | | | | | | | | Comp. Example | | |
|---|---|---|---|---|---|---|---|---|---|---|---|---|
| | | 1 | 2 | 3 | 4 | 5 | 6 | 7 | 8 | 1 | 2 | 3 |
| Polymer code | | P-1 | P-2 | P-3 | P-1 | P-1 | P-1 | P-1 | P-1 | CP-1 | CP-2 | P-1 |
| | $O_2$ permeability (at 80% RH, 23° C.; $cc/m^2 \cdot day \cdot atm$) | 0.45 | 0.46 | 0.47 | 0.43 | 0.45 | 0.47 | 0.45 | 0.48 | 950 | 1.00 | — |
| | $CO_2$ permeability (at 80% RH, 23° C.; $cc/m^2 \cdot day \cdot atm$) | 2.7 | 2.8 | 2.9 | 2.6 | 2.7 | 2.9 | 2.5 | 2.6 | 5000 | 5.0 | — |
| | Water vapor permeability (at 90% RH, 40° C.; $g/m^2 \cdot day$) | 5.9 | 6.1 | 6.0 | 5.8 | 5.8 | 5.9 | 6.0 | 5.9 | 250 | 11 | — |
| | Heat shrinkage (%) | <1 | <1 | <1 | <1 | <1 | <1 | <1 | <1 | 40 | <1 | — |
| | Degradability in soil | High | High | High | High | High | High | High | High | High | High | — |
| Remarks | | | | | | | | Blown-film extrusion | | *1 | Brittle | *2 |

*1 Polylactic acid.
*2 No film could be formed.

[EXAMPLE 9]

A portion of Pellet (No. 5) was used to produce an amorphous film in the same manner as in Example 5. The amorphous film was stretched 5 times in one direction and heat set at 150° C. for 1 minute while maintaining its length constant, thereby obtaining Oriented Film (F5-1) filled with the inorganic material.

Printing was conducted with a water-based marking pen (PENTEL SIGN, trade mark) on the surfaces of Oriented Film (F4-1) of Example 4 added with no inorganic material and Oriented Film (F5-1) of Example 9 filled with the inorganic material. When the printed areas were rubbed after the printing, the print on the former film was easy to erase. However, the print on the latter film was difficult to erase.

We claim:

1. An oriented polyglycolic acid film formed from a thermoplastic resin material which comprises polyglycolic acid having a repeating unit represented by the following formula (1):

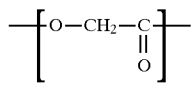

$$\left[ O-CH_2-\underset{\underset{O}{\|}}{C} \right] \quad (1)$$

and the following physical properties:
(a) the melt viscosity, η*, as measured at a temperature of the melting point, Tm, of the polymer+20° C. and a shear rate of 100/sec, being 500–100,000 Pa.s;
(b) the melting point, Tm, being at least 150° C.;
(c) the melt enthalpy, ΔHm, being at least 20 J/g; and
(d) the density being at least 1.50 $g/cm^3$ as measured in an unoriented, crystallized form,
wherein the film has a tensile strength of at least 150 MPa and a tensile modulus of at least 4.0 GPa.

2. The oriented film according to claim 1, wherein the oriented film is a uniaxially oriented or biaxially oriented film obtained by melt-extruding the thermoplastic resin material into a sheet or tube in a temperature range of from the melting point, Tm, to 255° C., quenching the sheet or tube and stretching the sheet or tube in at least a uniaxial direction at a draw ratio higher than one time but not higher than 20 times.

3. The oriented film according to claim 1, wherein the oriented film has an oxygen permeability, as measured at a temperature of 23° C. and 80% relative humidity and a film thickness of 25 μm, of 50 $cc/m^2$.day.atm or smaller.

4. The oriented film according to claim 1, wherein the oriented film has a carbon dioxide permeability, as measured at a temperature of 23° C. and 80% relative humidity and a film thickness of 25 μm, of 300 $cc/m^2$.day.atm or smaller.

5. The oriented film according to claim 1, wherein the oriented film has a water vapor permeability, as measured at a temperature of 40° C. and 90% relative humidity and a film thickness of 25 μm, of 100 $g/m^2$.day or smaller.

6. The oriented film according to claim 1, wherein the oriented film is degradable in soil.

7. The oriented film according to claim 1, wherein the oriented film has a heat shrinkage, as measured at 130° C. for 10 minutes, of at most 30%.

8. The oriented film according to claim 1, wherein the oriented film is a heat shrinkable film not subjected to heat setting.

9. The oriented film according to claim 1, wherein the thermoplastic resin material is composed of the polyglycolic acid alone.

10. The oriented film according to claim 1, wherein the thermoplastic resin material is a composition composed of the polyglycolic acid and at least one component selected from the group consisting of inorganic fillers, other thermoplastic resins and plasticizers.

11. The oriented film according to claim 10, wherein the thermoplastic resin material is a composition composed of the polyglycolic acid and at least one component selected from the group consisting of inorganic fillers, other thermoplastic resins and plasticizers and comprising 100 parts by weight of the polyglycolic acid, 0–100 parts by weight of the inorganic fillers, 0–100 parts by weight of the other thermoplastic resins and 0–200 parts by weight of the plasticizers.

12. The oriented film according to claim 10, wherein the thermoplastic resin material is a composition comprising 100 parts by weight of the polyglycolic acid and 0.01–10 parts by weight of the inorganic fillers.

13. The oriented film according to claim 1, wherein the polyglycolic acid is a homopolymer of glycolide obtained by ring-opening polymerization.

14. The oriented film according to claim 1, wherein the polyglycolic acid is a copolymer obtained by ring-opening polymerization of glycolide in a proportion not lower than 70 wt. %, but lower than 100 wt. % and at least one cyclic comonomer selected from the group consisting of ethylene oxalate, lactide, lactones, trimethylene carbonate and 1,3-dioxane in a proportion higher than 0 wt. %, but not higher than 30 wt. %.

15. The oriented film according to claim 14, wherein the polyglycolic acid is a copolymer of glycolide and ethylene oxalate.

16. The oriented film according to claim 14, wherein the polyglycolic acid is a copolymer of glycolide and lactide.

17. The oriented film according to claim 1, wherein the oriented polyglycolic acid film is a high-lubricity film formed from a thermoplastic resin material comprising 100 parts by weight of the polyglycolic acid and 0.01–5 parts by weight of inorganic powder and having a coefficient of dynamic friction of 0.35 or smaller at 23° C. against another of the high-lubricity films.

18. The oriented film according to claim 1, wherein the oriented polyglycolic acid film is a film having excellent printability and obtained by stretching an unoriented film formed from a thermoplastic resin material comprising 100 parts by weight of the polyglycolic acid and 0.5–100 parts by weight of powder of an inorganic material in such a manner that the draw ratio is at least 3 times in terms of an area ratio.

19. A process for producing an oriented polyglycolic acid film, comprising the steps of melt-extruding a thermoplastic resin material which comprises polyglycolic acid having a repeating unit represented by the following formula (1):

and the following physical properties:
 (a) the melt viscosity, $\eta^*$, as measured at a temperature of the melting point, Tm, of the polymer+20° C. and a shear rate of 100/sec, being 500–100,000 Pa.s;
 (b) the melting point, Tm, being at least 150° C.;
 (c) the melt enthalpy, $\Delta Hm$, being at least 20 J/g; and
 (d) the density being at least 1.50 g/cm$^3$ as measured in an unoriented, crystallized form, the melt extruding being performed through a T-die and in a temperature range of from the melting point, Tm, to 255° C., to form the thermoplastic resin material into a sheet; immediately quenching the sheet to the crystallization temperature, $Tc_1$, of the polymer or lower; causing the quenched sheet to pass through stretching rolls in a temperature range of from the glass transition temperature, Tg, of the polymer to the crystallization temperature, $Tc_1$, to stretch the sheet in a uniaxial direction at a draw ratio higher than one time but not higher than 20 times; and optionally heat-setting the stretched sheet for 1 second to 3 hours in a temperature range of from $Tc_1$ to Tm+10° C. while maintaining its length constant or under tension.

20. A process for producing an oriented polyglycolic acid film, comprising the steps of melt-extruding a thermoplastic resin material which comprises polyglycolic acid having a repeating unit represented by the following formula (1):

and the following physical properties:
 (a) the melt viscosity, $\eta^*$, as measured at a temperature of the melting point, Tm, of the polymer+20° C. and a shear rate of 100/sec, being 500–100,000 Pa.s;
 (b) the melting point, Tm, being at least 150° C.;
 (c) the melt enthalpy, $\Delta Hm$, being at least 20 J/g; and
 (d) the density being at least 1.50 g/cm$^3$ as measured in an unoriented, crystallized form, the melt extruding being performed through a T-die in a temperature range of from the melting point, Tm, to 255° C., to form the thermoplastic resin material into a sheet; immediately quenching the sheet to the crystallization temperature, $Tc_1$, of the polymer or lower; causing the quenched sheet to pass through stretching rolls in a temperature range of from the glass transition temperature, Tg, of the polymer to the crystallization temperature, $Tc_1$, to stretch the sheet in a machine direction at a draw ratio higher than one time but not higher than 10 times; stretching the uniaxially stretched sheet at a temperature ranging from Tg to $Tc_1$ in a transverse direction at a draw ratio higher than one time but not higher than 10 times; and optionally heat-setting the biaxially stretched sheet for 1 second to 3 hours in a temperature range of from $Tc_1$ to Tm+10° C. while maintaining its length constant or under tension.

21. A process for producing an oriented polyglycolic acid film, comprising the steps of melt-extruding a thermoplastic resin material which comprises polyglycolic acid having a repeating unit represented by the following formula (1):

and the following physical properties:
 (a) the melt viscosity, $\eta^*$, as measured at a temperature of the melting point, Tm, of the polymer+20° C. and a shear rate of 100/sec, being 500–100,000 Pa.s;
 (b) the melting point, Tm, being at least 150° C.;
 (c) the melt enthalpy, $\Delta Hm$, being at least 20 J/g; and
 (d) the density being at least 1.50 g/cm$^3$ as measured in an unoriented, crystallized form, the melt extruding being performed through a ring die for blown-film extrusion and in a temperature range of from the melting point, Tm, to 255° C., to form the thermoplastic resin material into a tube; immediately quenching the tube to the crystallization temperature, $Tc_1$, of the polymer or lower; inflating the quenched tube at a temperature ranging from the glass transition temperature, Tg, of the polymer to the crystallization temperature, Tc, to a blow-up ratio higher than one time but not higher than 10 times; taking up the blown tube at a take-up rate of 0.5–100 m/min in a machine direction through nip rolls at a draw ratio higher than one time but not higher than 10 times; and optionally heat-setting the biaxially stretched tube for 1 second to 3 hours in a temperature range of from $Tc_1$ to Tm+10° C. while maintaining its length constant or under tension.

* * * * *